US009182612B2

(12) United States Patent
Vignato

(10) Patent No.: US 9,182,612 B2
(45) Date of Patent: Nov. 10, 2015

(54) SYSTEM FOR FASTENING BRIDGE AND TEMPLES IN THE MANUFACTURE OF EYEGLASSES

(75) Inventor: Arcadio Vignato, Bassano del Grappa (IT)

(73) Assignee: LUXOTTICA S.R.L., Agordo (IT)

( * ) Notice: Subject to any disclaimer, the term of this patent is extended or adjusted under 35 U.S.C. 154(b) by 0 days.

(21) Appl. No.: 13/811,130

(22) PCT Filed: Jul. 20, 2011

(86) PCT No.: PCT/IB2011/053228
§ 371 (c)(1),
(2), (4) Date: Jan. 18, 2013

(87) PCT Pub. No.: WO2012/011059
PCT Pub. Date: Jan. 26, 2012

(65) Prior Publication Data
US 2013/0128218 A1  May 23, 2013

(30) Foreign Application Priority Data

Jul. 21, 2010 (IT) .............................. BL2010A0013

(51) Int. Cl.
G02C 1/02        (2006.01)
G02C 5/00        (2006.01)
G02C 13/00       (2006.01)

(52) U.S. Cl.
CPC .. *G02C 1/02* (2013.01); *G02C 5/00* (2013.01); *G02C 5/008* (2013.01); *G02C 13/001* (2013.01); *G02C 2200/12* (2013.01); *Y10T 29/31* (2015.01)

(58) Field of Classification Search
CPC .... C02C 1/02; C02C 13/001; C02C 2200/12; C02C 1/10; C02C 13/00
USPC .......................... 351/110, 140, 146, 147, 178
See application file for complete search history.

(56) References Cited

U.S. PATENT DOCUMENTS 6,250,755 B1 *  6/2001  Conner et al. ................. 351/110
2005/0034287 A1  2/2005  Xie
(Continued)

FOREIGN PATENT DOCUMENTS

| CN | 2537025 Y  | 2/2003 |   |        |
|----|------------|--------|---|--------|
| CN | 2876817 Y  | 3/2007 |   |        |
| EP | 0 561 763 A1 | 3/1993 | | |
| FR | 2 880 138  | * 6/2006 | ............... | G02C 1/02 |

(Continued)

*Primary Examiner* — Huy K Mai
(74) *Attorney, Agent, or Firm* — Pearne & Gordon LLP

(57) ABSTRACT

The invention relates to a system for fastening the bridge (30) or the hinge elements (10, 20) connecting the temples (A) to the lenses (L) of eyeglasses, where the ends of the bridge (30), as well as each of the ends (12, 22) of the temple connecting hinge elements (10, 20) which is directed towards the respective lens is furnished with a respective fork-shaped structure, with at least one pair of prongs (33-34, 36-37, 13-14, 23-24) lying in the plane at right angles to the plane of the lenses and where each lens is provided with holes (61-62, 63-64) located at the points of connection with the ends of the bridge (30) and/or of the temple connecting hinge elements (10, 20). The holes are equal in number to the number of prongs on the respective fork-shaped structures and comprise, inside them, respective tubular sleeves (53, 54). The prongs of each fork-shaped structure are pressed into the tubular sleeves, are flat, and have lateral walls (13*a*-13*b*, 14*a*-14*b*, 23*a*-23*b*, 24*a*-24*b*, 33*a*-33*b*, 34*a*-34*b*, 36*a*-36*b*, 37*a*-38*a*) which are flat and smooth and other walls which are knurled.

23 Claims, 4 Drawing Sheets

(56) References Cited

U.S. PATENT DOCUMENTS

2005/0128429 A1    6/2005    Spindelbalker
2005/0275793 A1    12/2005    Yamaguchi et al.
2009/0073378 A1    3/2009    Tabacchi

FOREIGN PATENT DOCUMENTS

IT    BL2004A000011 A    4/2004
WO    03/083553 A2    10/2003
WO    2007/132491 A1    11/2007

\* cited by examiner

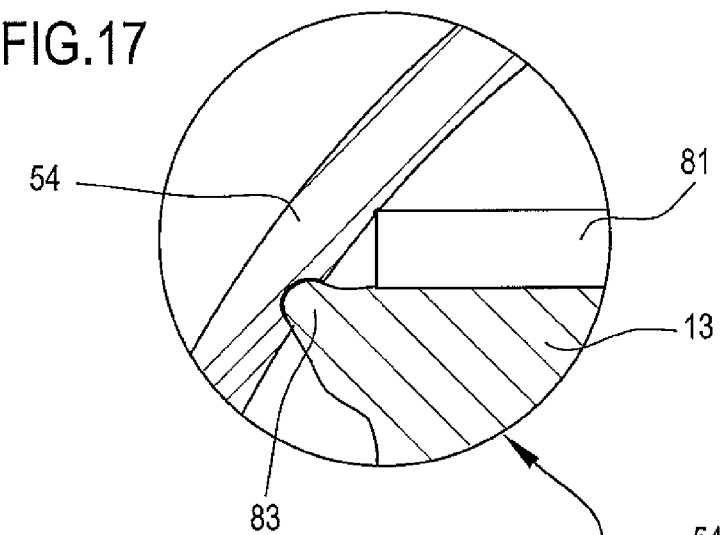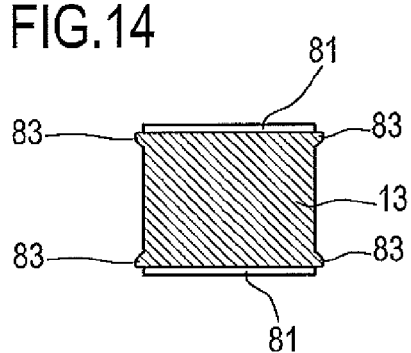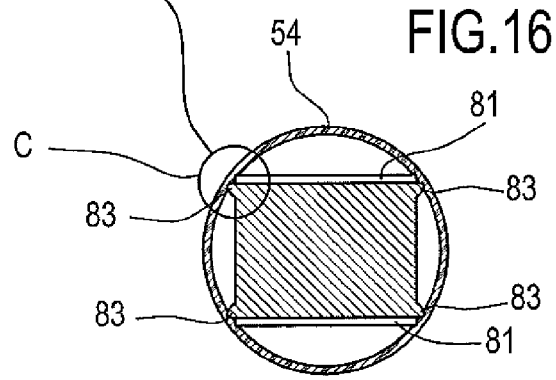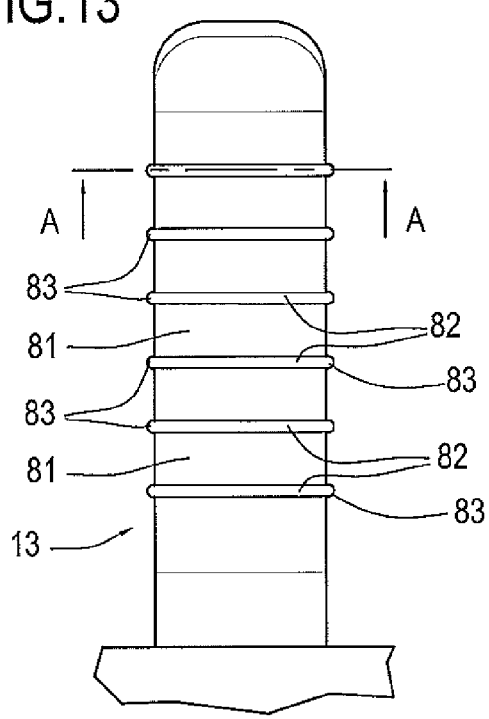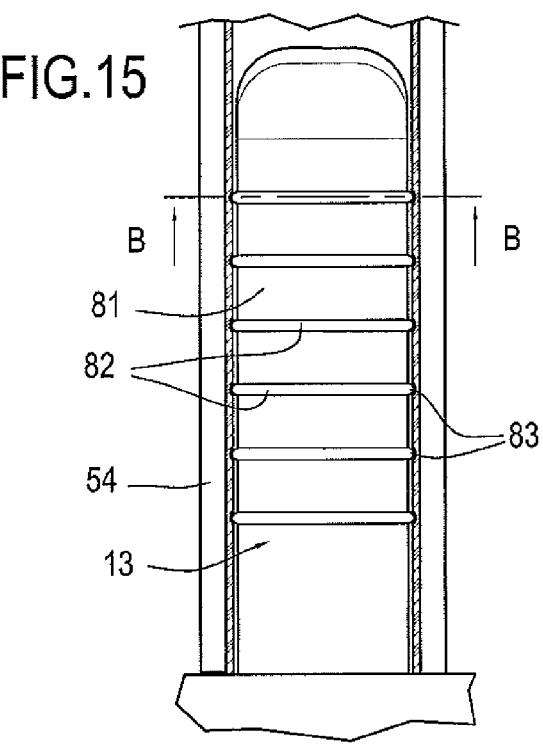

SYSTEM FOR FASTENING BRIDGE AND TEMPLES IN THE MANUFACTURE OF EYEGLASSES

TECHNICAL FIELD

This invention relates to a new system for fastening the central bridge and joining the lateral, temple hinge elements to the lenses of eyeglasses, especially but not necessarily of the type known as "ultralight" eyeglasses (also called "rimless" eyeglasses), that is to say, those without a full mounting frame structure, where the lenses are provided with front fastening and where the bridge and the lateral elements are made by die forming or punching out from a sheet of suitable metal alloy.

BACKGROUND ART

The traditional eyeglass frame consisting of a front rim, or central element, for fastening and supporting the lenses and whose ends are furnished with hinge elements for fastening and moving the temples, has been substantially revolutionized by the introduction of eyeglasses known as "ultralight" or "three-piece" eyeglasses where the lenses are joined directly to each other and to the temples solely by an interposed central bridge and a pair of lateral fastening hinge elements.

According to the prior art, the main feature of the method for forming a pair of "ultralight" eyeglasses is that of providing the ends of the central bridge and one of the two ends of the two lateral hinge elements connecting the eyeglass temples with a special fork-like structure at right angles to the plane of the lenses, the two prongs of each fork being designed to be inserted into corresponding pairs of holes made near the central and lateral edges of one lens.

All the prior art solutions of "ultralight" eyeglasses have had to overcome, for eyeglass solidity and durability, at least two structural problems connected with the firmness of the join between the edge of the lens and the central bridge element and with lens rattling relative to its fastening points.

More specifically, to eliminate rattling at the lens fastening points, most prior art solutions contemplate the presence, on each side of the lens edge, of a pair of through holes, or one through hole associated with one or more blind holes, or even with a lateral open hole, in which there is a fastener acting in conjunction with the retaining wire to prevent any form of lens rattling.

One prior art system for fastening the lenses to the mounting structure of ultralight eyeglasses is described in WO 03/083553. According to the system described in that document, the ends of the structural parts of the eyeglasses, namely, the central bridge and the lateral hinge elements, are furnished with two pairs of cylindrical pins made of amorphous plastic material, with annular enlargements, while a corresponding pair of holes in the lens is provided with and covered by a pair of sleeves which are joined to each other by a stop plate and to which are made of crystalline plastic material, to house in their cavities the cylindrical pins of the structural parts of the eyeglasses, in such a way that the annular enlargements of the pins push the outside surface of the respective sleeves to solidly engage the lateral surface of the lens holes, thus fixedly joining the lenses to the central bridge and to the lateral hinge elements of the eyeglass temples.

That solution, in turn derived from a similar lens fastening system proposed by patent EP 0561763 of Mar. 12, 1993, substantially meets the need to join the lenses of ultralight eyeglasses without using fastening screws to join the lenses to the other eyeglass parts, and thereby overcoming the frequent problem of lens cracking.

Use of that solution, however, has revealed a first drawback in the fact that the pins made of plastic material, besides having low mechanical strength—for example, low shock resistance—must nevertheless be made and specifically fixed to, or incorporated in, the ends of the bridges and of the lateral hinge elements, since they are made of different materials at different times and in different moulds from the parts they must be joined to, thus influencing the working times and conditions, as well as the costs of the eyeglasses.

Another drawback of that solution is due to the fact that, in the case of lenses which are thicker than average, the uniform and limited height of the fastening pins provides a relatively insecure fastening because the relative penetration of the pins into the lenses makes the free ends of the securing sleeves excessively flexible.

A yet further drawback of the stated prior art system is due to the impossibility of applying the fastening pins to the bridges and hinge elements made, for example, by die forming or punching out of metal sheets not only because of the relatively reduced thickness of their structure but also because of the impossibility of solidly joining them to those parts of the eyeglasses. This drawback has become more critical with the increase in the use of this method for the forming of high-quality sheeting made, for example, from titanium alloys for the manufacture of hinge elements, temples and even fronts for eyeglasses of all kinds and designs.

Another prior art example of a method for fastening the bridge and temples to the lenses without using threaded parts is described in US 2005/034287. As described in that document, the bridge and the hinge elements connecting the temples to the lenses are punched out from a thin metal plate. At the ends of them, they are provided with protruding members, each having ratchet-like teeth whose side walls are furnished with downwardly inclined barb-like projections. When fitting the lenses, the ratchet-like teeth are inserted directly into matching holes made in the lenses and the ends of them are left to protrude from the outside surface of the lenses.

The protruding ends are covered by a capping piece with hollowed-out holes into which they are inserted.

This further system of making ultralight eyeglasses without using threaded parts, although it allows the use of connecting elements punched out from thin metal sheeting, nevertheless has the disadvantage of having to insert the barbed, ratchet-like teeth into the holes in the lenses, with a high risk of damaging and cracking the lenses.

Moreover, forming the barbed surfaces on the side walls of the ratchet-like teeth requires the use of complex shaped dies which are expensive and quick to deteriorate.

A system for producing ultralight eyeglasses whose lens mounting structure consists of a bridge and two lateral hinge elements or end pieces made by punching out from quality sheeting is described in Italian patent application IT-BL2004A000011 dated Apr. 29, 2004.

In the system described in that application, each end of the lens mounting structure is furnished with a pair of teeth. The eye of a lens retaining wire is positioned between the teeth. The wire is fed through a hole made in the lens, while the teeth are inserted into corresponding sockets made in the lens radially relative to the holes through which the retaining wire is fed, thus holding the lens firmly in place when the retaining wire is fastened by a suitable lock nut.

The practical application of this solution has, in effect, allowed use of the new and advantageous technique of making bridges and end pieces by die forming from sheets made of quality material but has not entirely eliminated the problems of cracking caused by excessive tension applied by the retaining wire on the lens or the problems of looseness resulting from insufficient tightness of the retaining wire.

Patent document US 2005/275793 discloses eyeglasses where the temples and bridge are fixed to the lenses by means of pin-like teeth with rectangular cross section which are pressed into notches formed inside holes made in the lenses.

To anchor the teeth in the respective notches, the tooth surfaces have saw-tooth indentations on them.

The disadvantage of this solution is that the relative difficulty of engaging the teeth in the respective notches is not compensated by a particularly effective and secure hold of the bridge and temples on the lenses.

Thus, that system for fastening the bridge and temples is relatively unreliable and insecure.

AIMS OF THE INVENTION

The main purpose of this invention is to provide eyeglasses of the "ultralight" type whose mounting structure for the bridge and lateral hinge elements can be made by die forming, punching or any other method of cutting out from a sheet of quality material, such as a titanium alloy, and which can be fastened to the respective lenses in an optimum manner by a stable and secure fit without using retaining wires and without the risk of damaging the lenses while assembling the eyeglass components and allowing the use of punching dies of simple shape and hence relatively inexpensive.

In the context of this purpose, another aim of the invention is to provide eyeglasses of the "ultralight" type whose mounting structure is ready shaped and provided with suitable protrusions which do not require welding or mechanical fasteners and which allow the bridge and end pieces to be pressed directly into the edges of the lenses to be fitted.

Another aim of the invention is to provide eyeglasses of the "ultralight" type whose lateral hinge elements can be associated with flat temples (also made, for example, by die forming from the same sheet or from another sheet of suitable quality) in a particularly stable and secure manner.

A further aim of the invention is to provide eyeglasses of the above mentioned type and furnished with a mounting structure that is extremely simple and quick and easy to assemble.

A yet further aim of the invention is that of being applicable and adapted to lenses of any thickness and type.

SUMMARY OF THE INVENTION

The above mentioned purpose and aims are achieved in a fastening system according to claim 1 appended hereto and incorporated here by reference.

More specifically, this invention provides eyeglasses comprising:

two lenses, each of which has a pair of holes at a predetermined distance to from each other;

a bridge and connecting hinge elements for the temples;

tubular sleeves housed in the lens holes.

The bridge and the connecting elements are provided with pairs of prongs projecting from the selfsame bridge and connecting elements to be operatively inserted into the tubular sleeves.

The prongs have flat lateral faces.

Preferably, the prongs have four flat lateral faces, meaning that their transversal cross section is rectangular (or square).

According to the invention, the prongs have a rough texture along the longitudinal edges where the lateral faces meet.

For each edge of each prong, the rough texture consists of a plurality of protrusions (spaced along the longitudinal axis of extension of the prong).

The protrusions project in cantilever fashion from a surface, constituting a portion of flattened or pointed material extending in a direction substantially perpendicular to that surface.

The plurality of protrusions positioned along one edge of a prong form a sort of ridge projecting outwards from the edge of the prong (for example parallel to one of the faces of the prong, but it might also project along the direction of the diagonal of the rectangle defined by the transversal cross section of the prong).

Preferably, two opposite faces of each prong are flat and the other two opposite faces are knurled.

The knurls are made in a step of die forming the prongs whereby pressure applied to these opposite surfaces (designed to receive the knurling) entails a movement of material, by flattening, along transversal stretches of the prong.

Thus, the pressure along a transversal zone of the prong face produces two lateral burrs of material which form the aforesaid protrusions. The protrusions thus project in cantilever fashion from the smooth (non-knurled) faces.

Hence, the flattening of at least one of the faces by die forming (pressing) along transversal strips causes a certain amount of material at the ends of the transversal zones where the pressure is applied to be displaced past the edges, thus protruding in a direction substantially perpendicular to the smooth faces.

More specifically, the protrusions are located along the edges of each prong where two adjacent lateral surfaces (or faces) meet.

Hence, preferably, for each lateral edge of each prong, there are two rows of protrusions located at 90 degrees to each other on adjacent lateral surfaces.

A first row of protrusions consists of the ends of the protrusions defined by the knurls (thus, these protrusions project from the knurled surface); a second row of protrusions consists of the burrs of material displaced laterally past the edges (thus, these protrusions project in cantilever fashion from the smooth surfaces).

The protrusions of the two rows of protrusions of each edge are longitudinally spaced and alternated; thus, the protrusions projecting from the knurled surface and the protrusions projecting in cantilever fashion from the smooth surfaces extend longitudinally along the edge in an alternating succession and at 90 degrees to each other.

These protrusions are particularly effective in locking the prong in place in the cavity of the sleeve.

In effect, the knurling present on the central zones of the knurled faces contributes actively to the grip.

Preferably, the knurled faces are the larger faces (the transversal cross section of the prong being rectangular).

Preferably, the knurled faces are the upper and lower faces.

The protrusions create grip because they impinge "point by point" on the inside wall of the sleeve, which is cylindrical, penetrating inside the sleeve, which is preferably made of plastic.

Thus, the invention provides a fastening system according to claim 1 (as well as eyeglasses comprising the fastening system).

Preferably, at least one of the lateral walls (or faces) of each of the prongs defines a plurality of protrusions projecting in cantilever fashion from an adjacent smooth wall (or face).

Preferably, the protrusions create a rough texture along the edges where the lateral faces meet and have a flattened shape.

Preferably the protrusions are perpendicular to at least one of the smooth surfaces (or faces).

Preferably, the free ends of the prongs are rounded (for example hemispherical). This facilitates insertion of the prongs into the sleeves.

BRIEF DESCRIPTION OF THE DRAWINGS

Further constructional details, with reference to the achievement of the proposed aims, are described better below and made more apparent by the description of the elements making up the system according to the invention in a non-limiting example embodiment of it, as schematically illustrated in the accompanying drawings, in which:

FIG. 13 is a top view of one of the prongs forming part of the fastening system according to the invention;

FIG. 14 is a cross-section of the prong of FIG. 13 through the plane labelled A-A in FIG. 13;

FIG. 15 shows a detail of the prong of FIG. 13 inside a corresponding sleeve, in cross section through the plane including the longitudinal axis of extension of the prong and at right angles to the upper and lower faces of the selfsame prong;

FIG. 16 is a cross-section of the prong of FIG. 15 through the plane labelled B-B in FIG. 15;

FIG. 17 shows the detail labelled C in FIG. 16.

DETAILED DESCRIPTION OF THE PREFERRED EMBODIMENTS OF THE INVENTION

Figure 1:
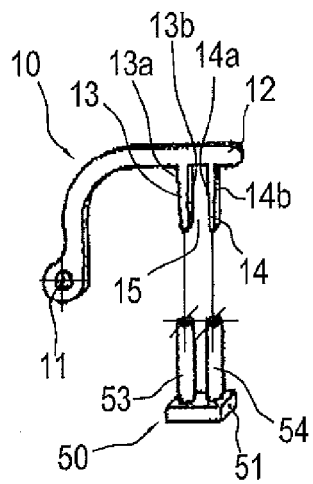
FIG. 1 is a perspective view, from the inside of the eyeglasses, showing the left-hand end piece or front made by die forming according to this invention and illustrated with one of its locking caps.
Figure 2:
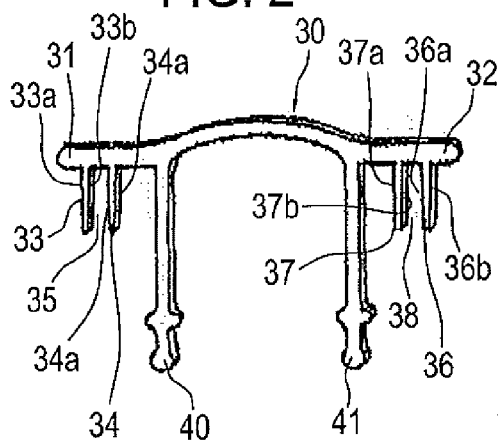
FIG. 2 is a perspective view, from the inside of the eyeglasses, showing the bridge, or central element joining the lenses, made by die forming according to this invention.
Figure 3:
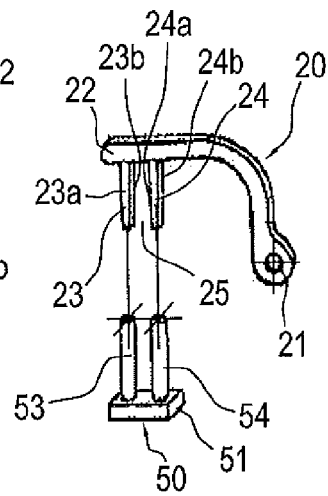
FIG. 3 is a perspective view, from the inside of the eyeglasses, showing the right-hand end piece or front made by die forming according to this invention and illustrated with one of its locking caps.

In all the accompanying drawings, the same parts are denoted or intended to be denoted by the same reference numbers. Details and features of the preferred embodiments of the invention are illustrated in FIGS. 1-17.

According to the solution of the invention as illustrated in the drawings, a pair of mutually opposed fronts or end pieces 10 and 20 and a central bridge 30 for mounting eyeglass lenses L can be formed from a single flat sheet of a suitable metal alloy, for example by die forming or punching, the sheet being uniform in thickness and constant in the quality of the material.

The end piece or hinge element 10 has an end with an eye 11, to be associated with the hinge end 60 of the temple A, while its opposite end 12, directed towards the lens, is in the shape of a fork, consisting of a pair of internal teeth or prongs 13-14, with a space or centre distance 15 between them.

Similarly, the end piece or hinge element 20 has an end with an eye 21, to be associated with the hinge end 60 of the opposite eyeglass temple A, while its opposite end 22, directed towards the lens, has a pair of internal teeth or prongs 23-24, with a space 25 between them.

The bridge 30 also has opposite ends 31 and 32, furnished with respective fork-shaped structures with prongs or teeth 33-34, separated by a space 35, and prongs or teeth 36-37, separated by a space or centre distance 38, where the shape and size of the teeth are substantially the same as those of the prongs on the end pieces 10 and 20.

Further, the bridge 30 may be made complete with stems 40 and 41 which, according to any of the prior art techniques, can be bent and formed in the shape and size required to support the nosepiece plates.

A feature of all the pairs of prongs or teeth 13-14-23-24-33-34 and 36-37 is that they are made with flat surfaces, are equal in thickness to the sheet from which they are punched out, and have flat, smooth vertical walls 13a-13b, 14a-14b, 23a-23b, 24a-24b, 33a-33b, 34a-34b, 36a-36b, 37a-37b positioned in such a way as to confer on the prongs or teeth a width such that they impinge on respective sleeves, as will be appreciated more clearly as this description continues.

In one embodiment of this invention, the lateral walls are parallel to each other at least along one stretch of their longitudinal extension.

Preferably, the lateral walls are parallel along the full extension of the prongs.

Alternatively, the lateral walls of the teeth or prongs are at an angle to each other and converge towards the free ends of the prongs or teeth.

In a variant embodiment of the prongs 13 and 14-33 and 34-37 and 38-23 and 24, their lateral surfaces may be inclined inversely, with the end stretch slightly larger in width than the base, again with a suitable taper.

In a further variant embodiment, the lateral walls of the prongs or teeth diverge towards their free ends.

Preferably, the end stretch of the longitudinal extension of the prongs or teeth is tapered (or the end portion of the prong is preferably rounded, hemispherically shaped, for example) while at least one of the front surfaces of at least one tooth has a rough texture obtained, for example, by knurling or scoring, particularly along the edges of their flat front surfaces.

The length of the prongs or teeth is greater than the thickness of any foreseeable type of lens L to be applied to the ultralight eyeglasses to be made (although this feature is not essential).

For each pair of prongs or teeth 13-14-23-24-33-34 and 36-37, the fastening system of the invention contemplates the use of a cap 50, made of a relatively soft plastic material and consisting of a base 51 with a pair of sleeves 53-54 which define respective blind holes 55-56, the length of the sleeves 53-54, too, being always greater than the thickness of any foreseeable type of lens L to be applied to the ultralight eyeglasses.

Preferably, the depth of the holes 55-56 is greater than the height of the their respective walls 53-54, and the holes might even be through holes.

A lens L, for example of the vision correction or eye protection type, has a profile shaped according to the desired eyeglass design and to be positioned on the two opposite sides of the eyeglasses.

Depending on shape and for better centring of visual focus, each lens L has two identical pairs of through holes 61-62 and 63-64 made in the proximity of the edges on the inner and outer sides of the selfsame lens L, respectively.

The centre distance of each pair of holes 61-62 and 63-64 is identical to the centre distances 15-25-35 and 38 between the teeth on the pairs 13-14-23-24-33-34 and 36-37 of the end pieces 10-20 and of the front 30, the diameter of the holes being substantially the same as the diameter of the sleeves 53-54 of each cap 50.

Figure 6:
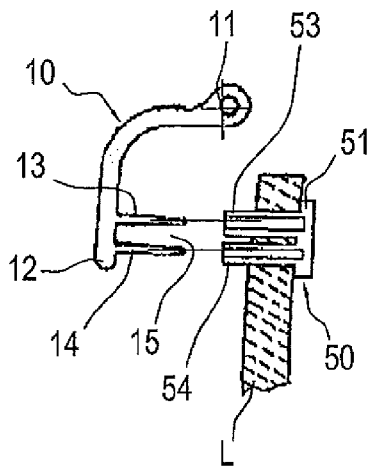
FIG. 6 is a transversal cross section of the lens of FIG. 5, through the section plane VI-VI, after the lens has been associated with the cap of FIG. 4 during application of the front or end piece of FIG. 1.

The system of the invention for fastening the bridge 30 and the end pieces 10-20 or hinge elements of the temples A to the lenses L, as illustrated in particular in FIG. 6, comprises a first step of engaging the sleeves 53-54 of one cap 50, for example, in the pair of through holes 61-62 of the outer side of the lens L, in such a way that the cap base 51 is in direct contact with the inside surface of the lens L, and then, similarly, engaging the other caps 50 in the holes 61-62 and 63-64 of both lenses L.

A second step in the system of the invention, not illustrated for simplicity, comprises cutting the protruding part of the sleeves 53-54, in such a way that their edges lie in the same plane as the outside surface of the lens L.

A third step of the method of the invention, comprises normally cutting the ends of the teeth 13-14-23-24-33-34 and 36-37, in such a way as to shorten them so their height is not greater than the thickness of the lens L to be used and, preferably, so that it is just less than the depth of the respective housings 55-56, after the sleeves 53-54 have been cut to the required length. Obviously, in the case of a very thick lens L, this cutting operation may not be necessary.

Figure 7:
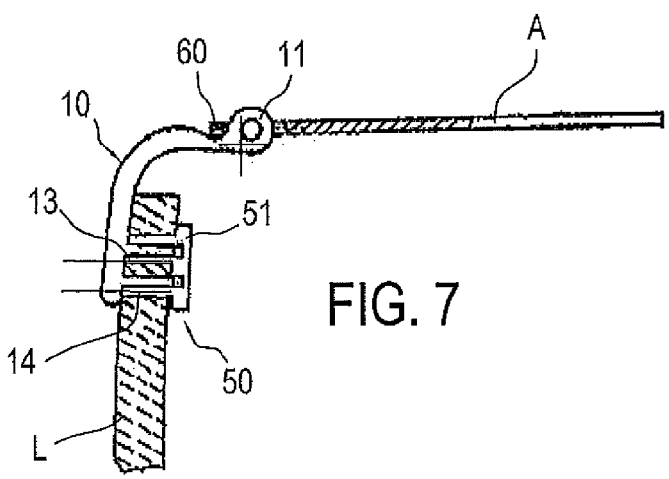
FIG. 7 is a transversal cross section like that of FIG. 6 after the front of FIG. 1 has been securely associated with the cap and lens of FIG. 6.
Figure 8:
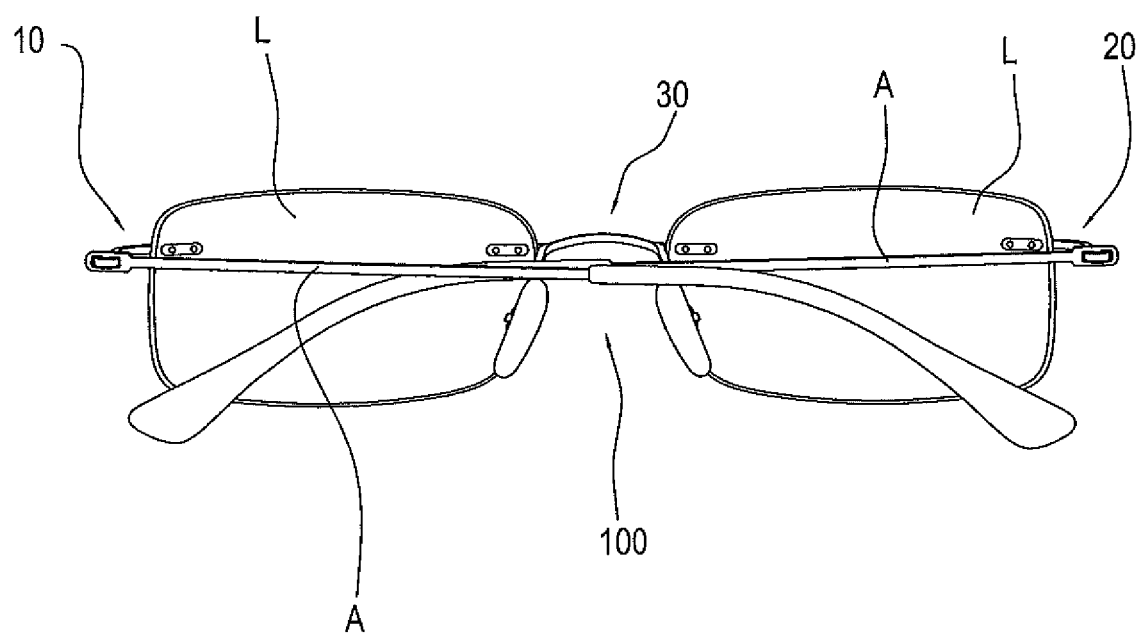
FIG. 8 shows eyeglasses according to the invention, where the lenses are fastened to the bridge and to the fronts (or end pieces) using the fastening system according to the invention.
Figure 9:
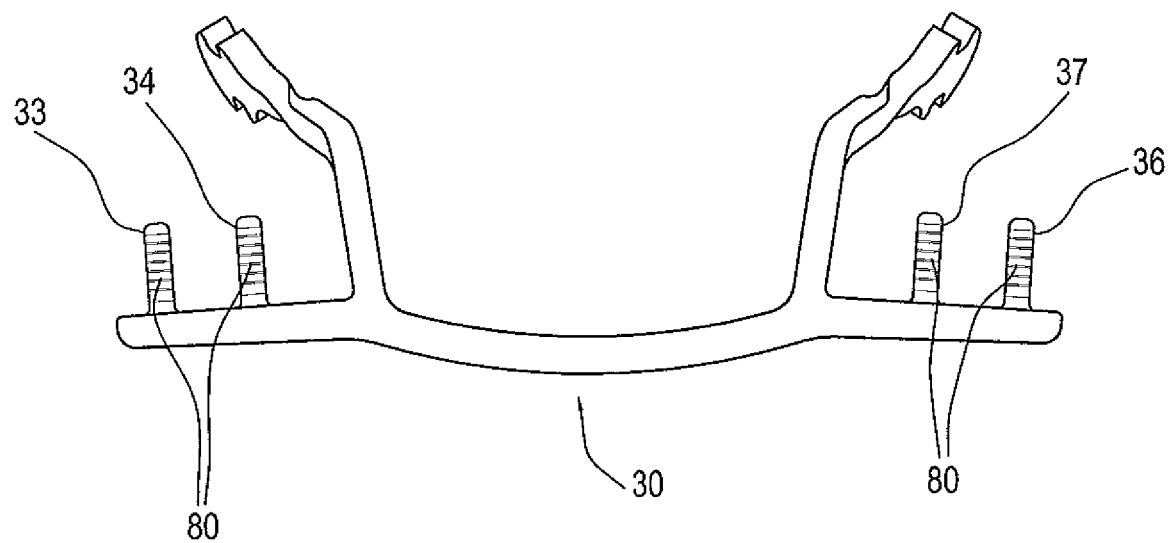
FIG. 9 is a top view of the mounting structure of the eyeglasses of FIG. 8.
Figure 10:
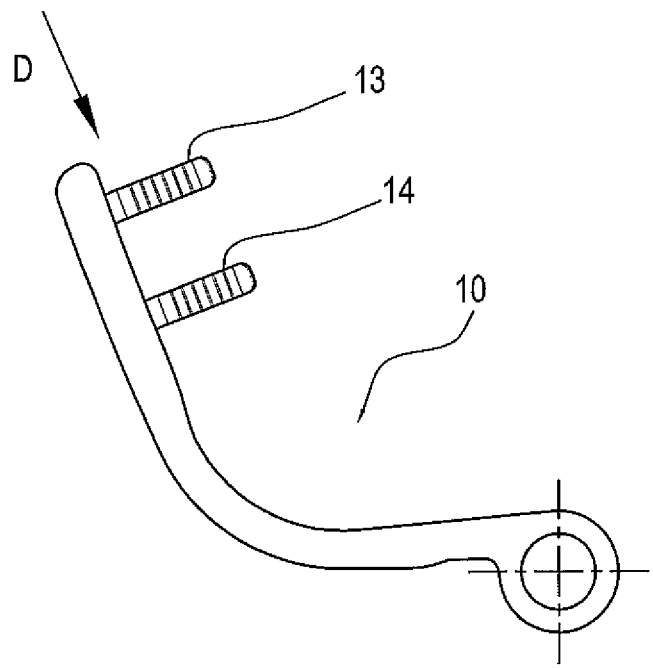
FIG. 10 is a top view of one of the fronts of the mounting structure of the eyeglasses of FIG. 8.
Figure 11:
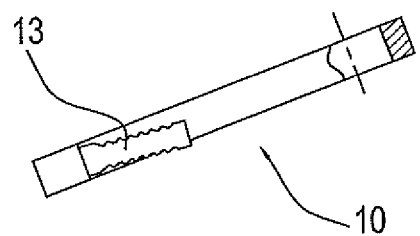
FIG. 11 shows the front of FIG. 10, in a view from the direction labelled D in FIG. 10.
Figure 12:
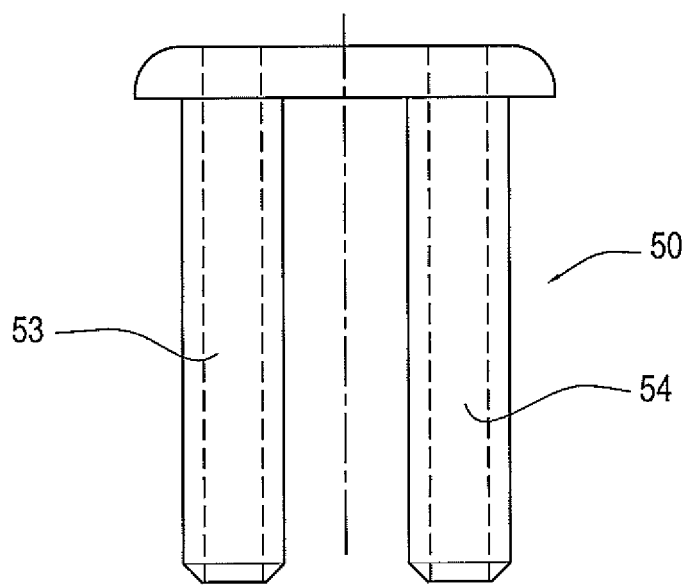
FIG. 12 is a top view of the cap forming part of the fastening system according to the invention.

With reference to FIG. 7, as already mentioned, a last step in the system of the invention comprises pressing the cut teeth, for example 13-14, into the holes 55-56 in the sleeves 53-54 which are already housed in the respective pairs of holes 61-62 and 63-64 in the lens L, until the inside edges of the ends 12-22-31-32 of the end pieces 10-20 and of the bridge 30, respectively, are in contact with the outside surface of the selfsame lens L.

Press fitting entails laterally pushing the teeth, for example 13-14, onto the cylindrical surface of the respective sleeves 53-54 and hence onto the surface of the respective holes 61-62 and 63-64 of both lenses L, with sufficient force to secure the end pieces 10-20 and the bridge 30 to the pair of lenses L, constituting the structure of the ultralight eyeglasses to be made.

In the variant embodiment already mentioned, the roughness made on one or both of the front surfaces of one or both of the teeth 13 and 14-33 and 34-36 and 37-23 and 24 further contributes to the stability of their grip in the respective cavities 55 and 56 of their caps 50, in particular under the effect of the forced anchoring of the cylindrical surface of the holes 55-56 of the cap 50 against the roughly textured part of the teeth.

Still with reference to FIG. 7, it is stressed that the eye 11 of the end piece 10 is associated with a temple A which is also made by die forming or punching, for example out of the same plate from which the end pieces 10-20 and the bridge 30 are made, or out of another plate, even made of another material, according to the temple fastening system which is described and claimed in the prior application IT-BL2004A11 and which can in any case be achieved by the system according to this invention.

According to the system as illustrated and described up to now, the eyeglasses made have a mounting structure obtained by die forming or punching, for example, out of sheets of high-quality metal alloys and where the lenses can be fastened without using retaining wires and lock nuts, in accordance with the main aim specified above.

The selfsame system makes it possible to provide protrusions for engaging and fastening the lenses without using welding or mechanical fasteners for joining the end pieces and the bridge to the lenses, in accordance with another of the aims specified above.

The production of the components and the succession of assembly steps are not only extremely simple and effective but also allow fastening to temples which are, for example, die formed and to lenses of any thickness, in accordance with other aims specified above.

As already stated, the embodiment illustrated and described up to know must be considered purely by way of non-limiting example.

Figure 4:
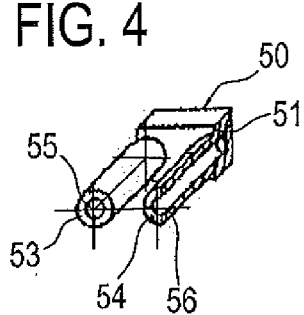
FIG. 4 is a perspective view of one of the locking caps of FIGS. 1 and 3.
Figure 5:
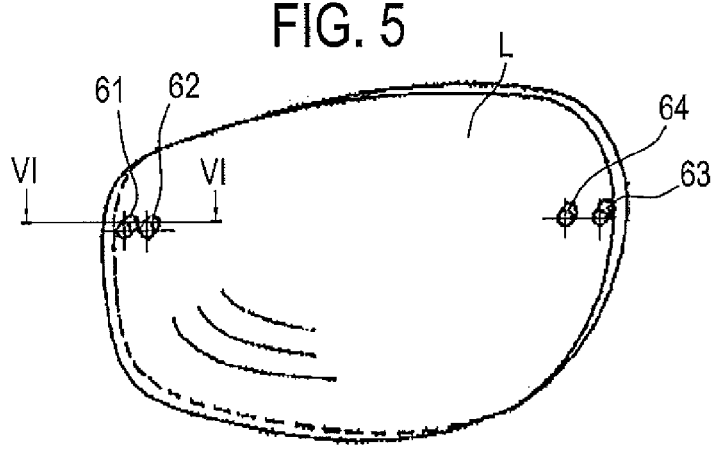
FIG. 5 is a side elevation view, from the outside, of a lens to be associated with the end piece of FIG. 1 and with the left-hand side of the bridge of FIG. 2 by interposing a pair of caps like the one of FIG. 4.

Indeed, it is possible, for example, to make end pieces 10-20 and/or bridges 30 of any shape and where the teeth, for example 13-14, are distributed and arranged differently relative to their ends 12, and in the same way, the bases 51 of the caps 50 may have shapes other than the rectangular shape shown as an example in FIG. 4.

It is also possible to make individual caps for single sleeves 53 and 54, instead of the cap 50 for two sleeves 53-54, and it is possible to make sleeves 53 and 54 which are open at both ends, without any cap.

The succession of the steps described above can also be varied to suit different production requirements and working conditions, without thereby departing from the scope of the invention as described above and claimed below.

More specifically, attention is further drawn to the following.

The knurled walls of the prongs 13 and 14-33 and 34-36 and 37-23 and 24 define a plurality of transversally positioned protrusions, or ribs 81.

These protrusions are alternated with corresponding recesses 82. In effect, the recesses are produced by the die forming (or by the compression) which the prongs are subjected to; thus, flattening the prongs on two opposite sides leads to the formation of the recesses 82 and, consequently, the ribs 81.

The recesses 82 and ribs 81 define knurling on the prong wall.

Each prong also comprises, at each edge where two adjacent lateral walls meet, a row of protrusions 83 positioned laterally of the recesses 82.

These protrusions project in cantilever fashion from (are positioned at 90 degrees to) the (smooth) lateral walls adjacent to the lateral walls defining the knurls 80.

The protrusions 83 constitute bosses produced by a lateral displacement of the material the prong is made of under the flattening action caused by the die forming process to obtain the knurls 80.

Thus, each edge of each prong has two rows of protrusions.

A first row of protrusions consists of the lateral ends of the ribs 81 and extends outwards from the laterals walls provided with the knurls 80.

A second row of protrusions consists of the protrusions or bosses 83 which project in cantilever fashion from the smooth walls, at the recesses 82.

Thus, for each edge, the protrusions of the two rows are alternated with each other (spaced longitudinally in alternating fashion along the edge) and positioned at 90 degrees.

The protrusions 83 preferably have a flattened shape.

Thus, the protrusions 83 (even together with the protrusions defined by the ends of the ribs 81) create a rough texture along the edges where lateral faces (or walls) meet.

For each prong, therefore, two of the four surfaces are smooth, that is to say, do not have the knurls 80; these surfaces nevertheless have, along the edges, two opposite rows of protrusions 83, in the shape of fingernails projecting in cantilever fashion from (that is, at 90 degrees to) the selfsame surfaces.

Preferably, the ends of the prongs 13 and 14-33 and 34-36 and 37-23 and 24 have a rounded shape; for example they are hemispherical.

Advantageously, this makes it easier for them to be inserted into the sleeves.

This invention also provides eyeglasses 100 comprising:
a bridge 30;
a pair of fronts 10, 20 hinged to corresponding temples A;
a pair of lenses L;
a fastening system for anchoring the bridge 30 and the fronts 10, 20 to the lenses L.

According to the invention, the fastening system is made according to what is described above.

More specifically, each lens L has a pair of holes at a predetermined distance from each other.

The bridge 30 and the pair of fronts 10, 20 are furnished with hinge elements connecting them to the pair of temples (or sidepieces) A.

The fastening system also comprises tubular sleeves 53, 54 (made of plastic, for example) housed in the holes in the lenses L.

The bridge 30 and the fronts 10, 20 are furnished with pairs of prongs 13 and 14-33 and 34-36 and 37-23 and 24 projecting from the selfsame bridge and fronts to be operatively inserted into the tubular sleeves 53, 54, the prongs having flat lateral faces (and rectangular or square cross section).

More specifically, according to the invention, the prongs 13 and 14-33 and 34-36 and 37-23 and 24 have, along the longitudinal edges where the lateral faces (or walls) meet, a rough texture formed by a plurality of protrusions 83, 81 projecting in cantilever fashion from both the lateral surfaces defining the edge.

Preferably, the protrusions 83, 81 forming the rough texture along the edges of the prongs 13 and 14-33 and 34-36 and 37-23 and 24 are arranged, on each edge, in a first row projecting from one of the faces, and in a second row projecting from the other face, the protrusions of the two rows being positioned at 90 degrees to each other.

Preferably, for each edge, the protrusions of the two rows are spaced longitudinally in alternating fashion.

This enhances the grip of the prongs in the sleeves.

As regards the method for making the eyeglasses 100, it should be noted that it, too, comprises a step of die forming the prongs 13 and 14-33 and 34-36 and 37-23 and 24, to form the knurls 80 on two opposite surfaces of each prong.

Preferably, the die forming is carried out in such a way as to produce, on each prong, four rows of protrusions projecting in cantilever fashion from the smooth surfaces of the prong (two rows for each smooth face), perpendicular to the ribs 81 of the knurls 80.

The invention claimed is:

1. A system for fastening at least the bridge (30) or at least the hinge elements (10, 20) connecting the temples (A) to the lenses (L) of eyeglasses, where the bridge and the temple connecting hinge elements are made by die forming or punching out from a metal alloy sheet and where the ends of the bridge (30), and each of the ends (12, 22) of the temple connecting hinge elements (10, 20) which is directed towards the respective lens, is furnished with a respective fork-shaped structure, with at least one pair of prongs (33-34, 36-37, 13-14, 23-24) lying in a plane at right angles to the plane of the lenses and where each lens is provided with holes (61-62, 63-64) located at the points of connection with the ends of the bridge (30) or of the temple connecting hinge elements (10, 20) or both, these holes being equal in number to the number of prongs on the respective fork-shaped structures and comprising, inside the holes, respective tubular sleeves (53, 54), the prongs of each fork-shaped structure being press fitted into the tubular sleeves,
wherein the prongs of the fork-shaped structures are flat and have vertical walls (13a-13b, 14a-14b, 23a-23b, 24a-24b, 33a-33b, 34a-34b, 36a-36b, 37a-37b) which are flat and smooth.

2. The fastening system according to claim 1, wherein the width of each of the prongs (33-34, 36-37, 13-14, 23-24) of the fork-shaped structures is such that each prong impinges on the respective tubular sleeve (53, 54) into which it is inserted.

3. The fastening system according to claim 1, wherein the vertical walls (13a-13b, 14a-14b, 23a-23b, 24a-24b, 33a-33b, 34a-34b, 36a-36b, 37a-37b) of each of the prongs of the fork-shaped structures are parallel to each other at least along one stretch of their longitudinal extension.

4. The fastening system according to claim 3, wherein the lateral walls (33-34, 36-37, 13-14, 23-24) of each of the prongs of the fork-shaped structures are parallel to each other along their full extension.

5. The fastening system according to claim 1, wherein the vertical walls (13a-13b, 14a-14b, 23a-23b, 24a-24b, 33a-33b, 34a-34b, 36a-36b, 37a-37b) of each of the prongs of the fork-shaped structures are at an angle to each other and diverge towards the free ends of the prongs.

6. The fastening system according to claim 1, wherein at least one of the vertical walls (13a-13b, 14a-14b, 23a-23b, 24a-24b, 33a-33b, 34a-34b, 36a-36b, 37a-37b) of each of the prongs provides a plurality of protrusions projecting in cantilever fashion from an adjacent smooth wall.

7. The fastening system according to claim 6, wherein the protrusions provide a rough texture along the edges where the lateral faces meet and have a flattened shape.

8. The fastening system according to claim 6, wherein the protrusions are perpendicular to at least one of the smooth walls.

9. The fastening system according to claim 1, wherein a surface of a front wall of each respective prong is provided with roughening knurls.

10. The fastening system according to claim 1, wherein the prongs (33-34, 36-37, 13-14, 23-24) of the fork-shaped structures have a longitudinal extension which is at least equal to the thickness of a thickest eyeglass lens.

11. The fastening system according to claim 1, wherein each of the fork-shaped structures has two prongs.

12. The fastening system according to claim 1, wherein the tubular sleeves (53, 54) are made of plastic material and are open at the end opposite the end into which the prongs of the fork-shaped structures are inserted.

13. The fastening system according to claim 1, wherein the tubular sleeves (53, 54) are made of plastic material and are closed or open at the end opposite the end into which the prongs of the fork-shaped structures are inserted.

14. The fastening system according to claim 1, wherein the tubular sleeves (53, 54) are made of plastic material and are joined to each other by a connecting cap (50) located at the end opposite the end into which the prongs of the fork-shaped structures are inserted.

15. The fastening system according to claim 1, wherein the ends of the prongs have a rounded shape.

16. Eyeglasses comprising:
a bridge;
a pair of hinge elements hinged to corresponding temples;
a pair of lenses;
a fastening system for anchoring the bridge and the hinge elements to the lenses, wherein the fastening system is a fastening system according to claim 1.

17. Eyeglasses (100) comprising:
two lenses (L), each lens having a pair of holes (61, 62, 63, 64) at a predetermined distance from each other;
a bridge (30) and a pair of fronts (10, 20) furnished with hinge elements connecting the fronts to a pair of temples (A);
tubular sleeves (53, 54) housed in the lens holes,
wherein the bridge (30) and the fronts (10, 20) are furnished with pairs of prongs (33-34, 36-37, 13-14, 23-24) projecting from the selfsame bridge and fronts to be operatively inserted into the tubular sleeves (53, 54), the prongs having flat lateral faces,
wherein the prongs have, along the longitudinal edges where lateral and vertical walls of the respective prong meet, a rough texture formed by a plurality of protrusions projecting in cantilever fashion from lateral surfaces defining the edge.

18. The eyeglasses according to claim 17, wherein at least one of the lateral walls of each prong has a smooth surface.

19. The eyeglasses according to claim 17, wherein the protrusions forming the rough texture are arranged, on each edge, in a first row projecting from one of the faces, and in a second row projecting from the other of the faces, the protrusions of the two rows being positioned at 90 degrees to each other.

20. The eyeglasses according to claim 19, wherein, for each edge, the protrusions of the first and second rows are spaced longitudinally in alternating fashion.

21. A method for making ultralight eyeglasses, comprising a step of providing a bridge and hinge elements connecting respective temples to respective lenses with ends which are furnished with fork-shaped structures, each of the latter having at least two prongs (33-34, 36-37, 13-14, 23-24), by punching out from a metal plate, the prongs being furnished with vertical walls (13a-13b, 14a-14b, 23a-23b, 24a-24b, 33a-33b, 34a-34b, 36a-36b, 37a-37b) which are flat and smooth; a step of forming holes (61, 62, 63, 64) in the lenses at the points of connection with the ends of the bridge (30) and of the temple connecting hinge elements (10, 20), the holes being equal in number to the number of prongs on the respective fork-shaped structures at the ends of the bridge (30) and of the temple connecting hinge elements (10, 20); a step of inserting tubular sleeves (53, 54), furnished with a cap at one end, into the corresponding holes (61, 62, 63, 64) formed in the lenses, making the sleeve cap adhere to the inside surface of each lens; a step of cutting the portion, if any, of the sleeves (53, 54) which protrudes from the outside surface of the lenses, thereby adapting the length of the sleeves (53, 54) to the actual thickness of the lenses; and a step of pressing the prongs (33-34, 36-37, 13-14, 23-24) of the fork-shaped structures into the portion of the tubular sleeves (53, 54) housed inside the holes in the lenses.

22. The method according to claim 21, comprising a step of die forming the prongs to create knurls on two opposite walls of each prong.

23. The method according to claim 22, wherein the die forming step produces four rows of protrusions projecting in cantilever fashion from each of said two opposite walls of each prong.

* * * * *